(12) United States Patent
Kather et al.

(10) Patent No.: US 12,040,825 B2
(45) Date of Patent: Jul. 16, 2024

(54) FREQUENCY RANGE CONVERSION

(71) Applicants: ADVANTEST CORPORATION, Tokyo (JP); FARRAN TECHNOLOGY LIMITED, Cork (IE)

(72) Inventors: Daniel Kather, Stuttgart (DE); Michael Crowley, Cork (IE)

(73) Assignees: ADVANTEST CORPORATION, Tokyo (JP); FARRAN TECHNOLOGY LIMITED, Cork (IE)

(*) Notice: Subject to any disclaimer, the term of this patent is extended or adjusted under 35 U.S.C. 154(b) by 64 days.

(21) Appl. No.: 17/891,130

(22) Filed: Aug. 18, 2022

(65) Prior Publication Data

US 2022/0407548 A1 Dec. 22, 2022

Related U.S. Application Data

(63) Continuation of application No. PCT/JP2020/020199, filed on May 21, 2020.

(51) Int. Cl.
| | |
|---|---|
| *H04B 1/38* | (2015.01) |
| *H04B 1/00* | (2006.01) |
| *H04B 1/10* | (2006.01) |
| *H04B 1/18* | (2006.01) |
| *H04B 17/29* | (2015.01) |
| *H04L 5/16* | (2006.01) |

(52) U.S. Cl.
CPC ........... *H04B 1/1027* (2013.01); *H04B 1/005* (2013.01); *H04B 1/18* (2013.01); *H04B 17/29* (2015.01); *H04B 2001/1072* (2013.01)

(58) Field of Classification Search
CPC ...... H04B 1/1027; H04B 17/29; H04B 1/005; H04B 1/18; H04B 2001/1072; H04B 1/745; H04B 1/0458
USPC ........ 375/222, 219, 220, 295, 316, 350, 229
See application file for complete search history.

(56) References Cited

U.S. PATENT DOCUMENTS

| | | | |
|---|---|---|---|
| 5,235,640 A | 8/1993 | Devries | |
| 8,798,564 B2 * | 8/2014 | Klein | H04B 1/0458 455/127.2 |
| 10,560,134 B2 | 2/2020 | Ho | |
| 2023/0275604 A1 * | 8/2023 | Puzzo | H04B 1/745 375/262 |

FOREIGN PATENT DOCUMENTS

EP 1104953 A1 6/2001

OTHER PUBLICATIONS

U.S. Appl. No. 63/001,179, filed Mar. 27, 2020.*
(ISA/237) Written Opinion of the International Search Authority for International Patent Application No. PCT/JP2020/020199, issued/mailed by the Japan Patent Office on Feb. 15, 2021.

* cited by examiner

*Primary Examiner* — Phuong Phu (57) ABSTRACT

Frequency ranges may be converted by an apparatus including a converter configured to shift an original frequency range of an input data signal to a target frequency range, an input band selective filter bank configured to route the input data signal through a bandpass filter of a selected subrange within the target frequency range, the input selective filter bank including a plurality of bandpass filters, each bandpass filter having a corresponding subrange within the target frequency range.

19 Claims, 7 Drawing Sheets

FREQUENCY RANGE CONVERSION

This is a continuation application of International Application PCT/JP2020/020199 filed on May 21, 2020, the contents of which are incorporated herein by reference.

BACKGROUND

1. Technical Field

The present invention relates to frequency range conversion. More specifically, the present invention relates to shifting original frequency range of an input data signal to a target frequency range.

2. Related Art

Fifth generation wireless (5G) is a wireless networking architecture built on the 802.11ac IEEE wireless networking standard, which aims to increase data communication speeds by up to three times compared to its predecessor, 4G (IEEE 802.11n). Various frequency bands have been identified for use in the 5G spectrum, including 24-28 GHz, 31-33 GHz, 37-43 GHz, and now up to 53 GHz. However, existing test equipment is designed for 3G & 4G networks.

DETAILED DESCRIPTION OF EMBODIMENT

Hereinafter, example embodiments of the present invention will be described. The example embodiments shall not limit the invention according to the claims, and the combinations of the features described in the embodiments are not necessarily essential to the invention.

Embodiments of the present invention may allow use of existing equipment and associated peripherals to test the new requirements of next generation 5G high speed broadband links. In some embodiments, a module including a broadband integrated up/down converter can be added to existing baseband test equipment so that the existing equipment can be used to test the new 5G frequency bands.

In exemplary embodiments, the module may receive an input Local Oscillator (LO) signal at a baseband frequency and condition, and distribute this LO signal to supply up-converting and down-converting chains, routing the LO signal through a doubler chain with associated filtering where necessary for higher frequencies.

Such up-converting chains may be used to test performance of a 5G device receiver. The module may further receive an input signal at an Intermediate Frequency (IF), then amplify and condition the input signal before mixing with the LO signal to shift the input signal frequency band from the IF band to a 5G frequency band. The input signal may then be routed through further amplifiers and a band selective filter bank to increase signal purity by reducing signal detriment due to LO signal leakage, and thereby increasing quality of testing. This may mitigate the problems encountered when making such a module were interference of the LO signal with the data signal, such as when up-converting IF input signals to 5G signals.

Figure 1:
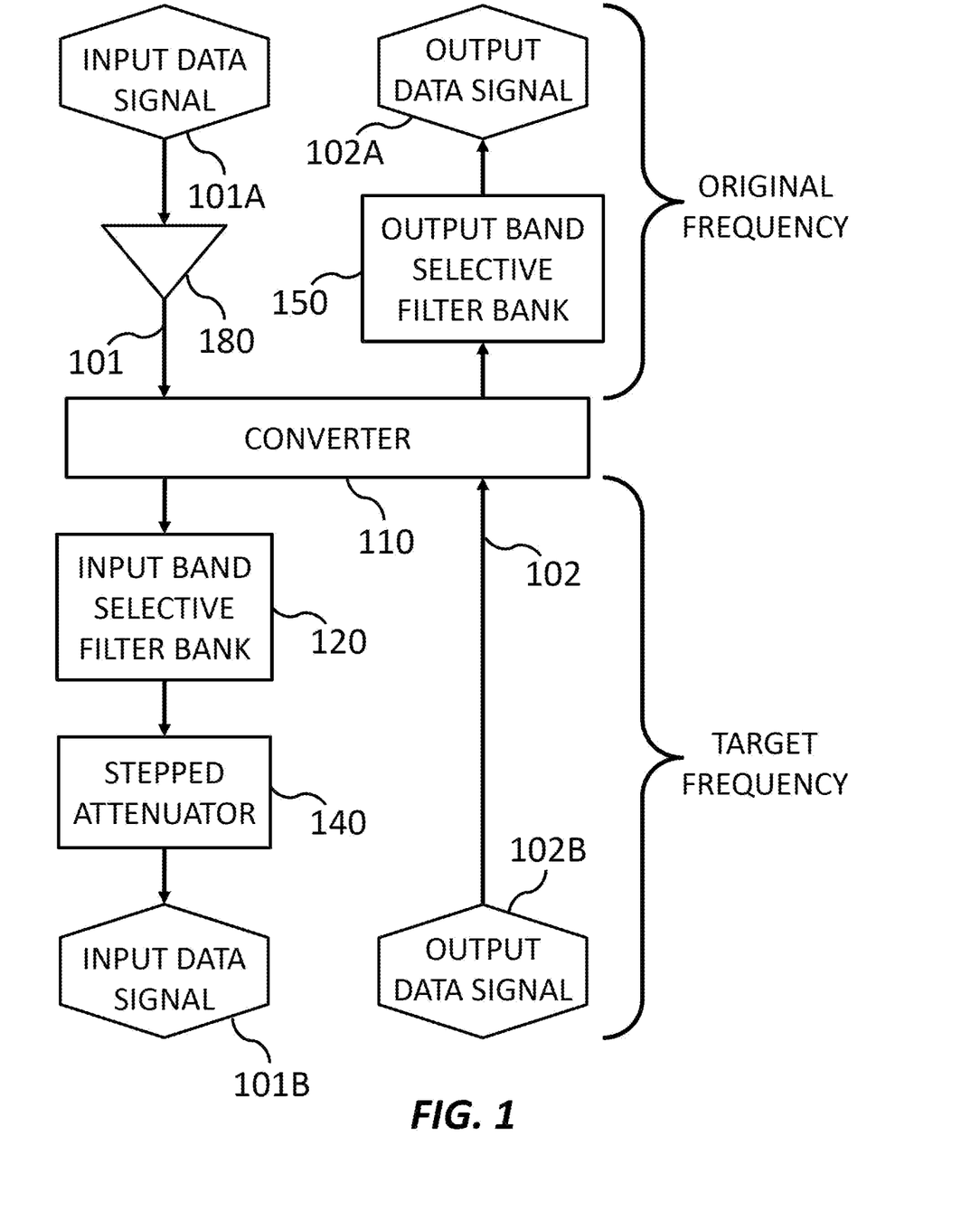
FIG. 1 shows an apparatus for frequency range conversion, according to an embodiment of the present invention.

FIG. 1 shows an apparatus for frequency range conversion, according to an embodiment of the present invention. In this exemplary embodiment, the apparatus includes an amplifier 180, a converter 110, an input band selective filter bank 120, a stepped attenuator 140, and an output band selective filter bank 150.

Amplifier 180 is configured to increase the intensity of input data signal 101A. Amplifier 180 may receive input data signal 101A from a testing device, another converter, a switch, or anything else capable of signal transmission or relay. Once the intensity of input data signal 101 is increased, amplifier 180 relays input data signal 101 to converter 110.

Converter 110 is configured to shift an original frequency range of an input data signal 101A to a target frequency range. Converter 110 receives input data signal 101 from amplifier 180. Once the original frequency range of input data signal 101 has been shifted to the target frequency range, converter 110 relays input data signal 101 to input band selective filter bank 120. For example, the original frequency range may be 4G and the target frequency range may be 5G.

Converter 110 is further configured to shift the target frequency range of an output data signal 102B to the original frequency range. Converter 110 may receive output data signal 102B from a device under test, another converter, a switch, or anything else capable of signal transmission or relay. Once the target frequency range of output data signal 102 has been shifted to the original frequency range, converter 110 relays output data signal 102 to output band selective filter bank 150.

Input band selective filter bank 120 is configured to route input data signal 101 through a bandpass filter of a selected subrange within the target frequency range. Input selective filter bank 120 may include a plurality of bandpass filters. Each bandpass filter may have a corresponding subrange within the target frequency range. Input band selective filter bank 120 receives input data signal 101 from converter 110. Once filtered, input band selective filter bank 120 relays input data signal 101 to stepped attenuator 140.

Stepped attenuator 140 is configured to decrease the intensity of the input data signal at the target frequency range. Stepped attenuator 140 receives input data signal 101 from input band selective filter bank 120. Once the intensity of input data signal 101 has been decreased, stepped attenuator 140 relays input data signal 101B. Stepped attenuator 140 may relay input data signal 101B to a device under test, another converter, a switch, or anything else capable of signal reception.

Output selective filter bank 150 is configured to route output data signal 102 through a bandpass filter of a selected subrange within the original frequency range. Output selective filter bank 150 may include a plurality of bandpass filters. Each bandpass filter may have a corresponding subrange within the original frequency range. Output band selective filter bank 150 receives output data signal 102 from converter 110. Once filtered, output band selective filter bank 150 relays output data signal 102A. Output band selective filter bank 150 may relay output data signal 102A to a testing device, another converter, a switch, or anything else capable of signal reception.

Although only one amplifier is shown in this exemplary embodiment, those having skill in the art will recognize that one or more amplifiers may be used in between various components in the apparatus in order to ensure that each component receives a well-articulated signal. While this exemplary embodiment includes components for shifting both input and output data signals, in another embodiment, only the components for shifting one data signal are included, which can be useful for one-way communication. The stepped attenuator in this exemplary embodiment decreases the intensity of the input data signal after it has been filter through the input band selective filter bank. However, in other embodiments, the stepped attenuator may decrease the intensity of the input data signal before the input data signal is filtered through the input band selective filter bank.

Figure 2:
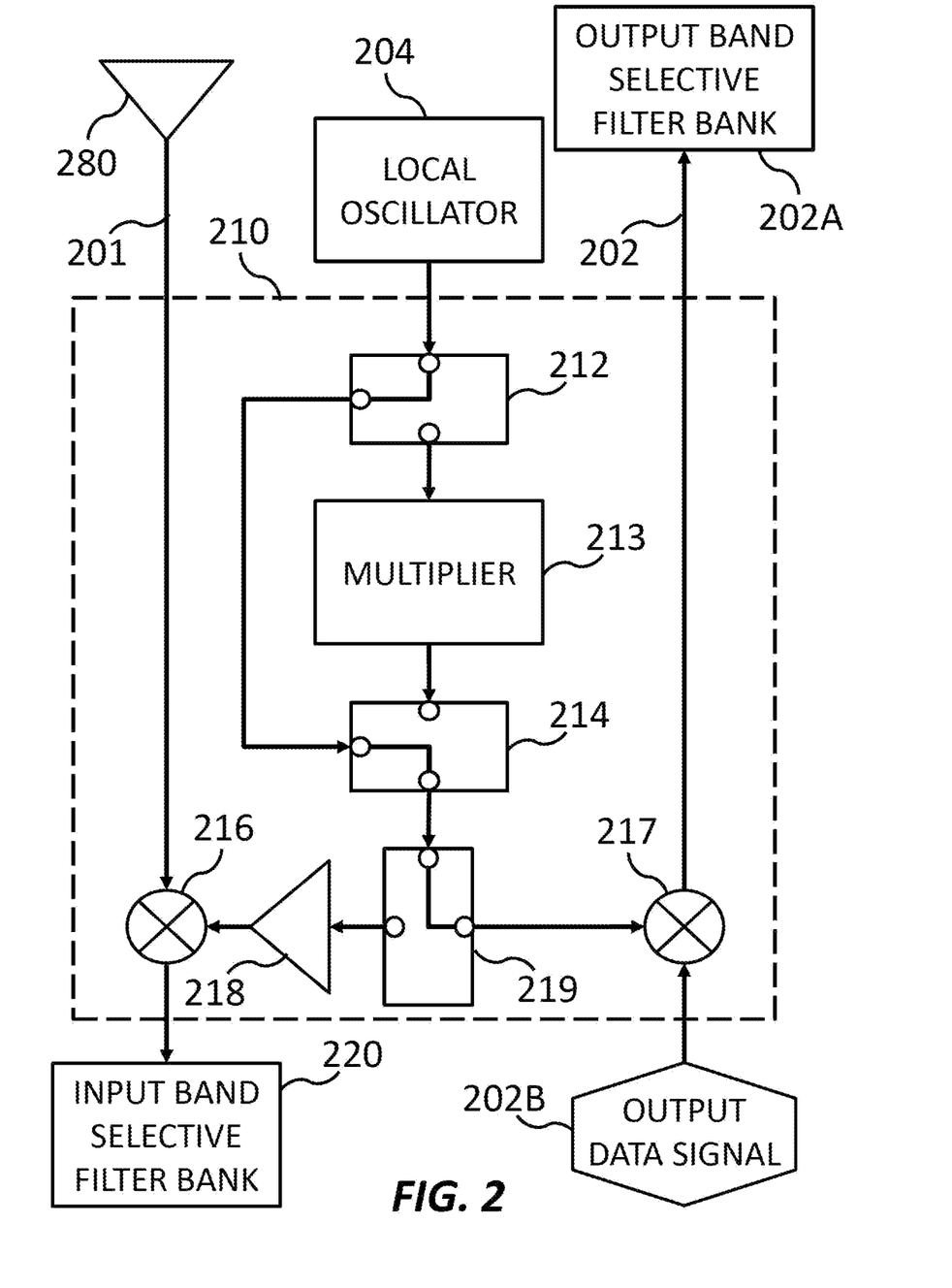
FIG. 2 shows a converter of an apparatus for frequency range conversion, according to an embodiment of the present invention.

FIG. 2 shows a converter 210 of an apparatus for frequency range conversion, according to an embodiment of the present invention. In this exemplary embodiment, converter 210 includes a multiplier 213, an input mixer 216, and output mixer 217, an amplifier 218, and switches 212, 214, and 219.

Multiplier 213 is configured to multiply the frequency of an LO signal by a whole number. For example, multiplier 213 may double the LO signal. In other words, converter 110 may include a frequency doubler configured to double the local oscillation frequency range. Multiplier 213 receives the LO signal from a local oscillator 204. Once the LO signal has been multiplied, multiplier 213 relays the LO signal to input mixer 216 or output mixer 217. Because the target frequency range is sufficiently broad, conversion of an input signal may not require a multiplied LO signal. Switches 212 and 214 are configured to bypass multiplied 213 when the LO signal does not need to be multiplied. Because converter 210 is configured to shift an original frequency range of an input data signal 201 to a target frequency range, and to shift the target frequency range of an output data signal 202 to the original frequency range, switch 219 is configured to direct the LO signal, in a multiplied or non-multiplied state, to one of the input mixer 216 and output mixer 217.

Input mixer 216 is configured to mix input data signal 201 with a local oscillation signal of a local oscillation frequency range to shift an original frequency range of input data signal 201 to a target frequency range. Input mixer 216 receives input data signal 201 from amplifier 280 and the LO signal from switch 219 through amplifier 218. Once input data signal 201 has been mixed with the LO signal, input mixer 216 relays input data signal 201 to input band selective filter bank 220.

Output mixer 216 is configured to mix output data signal 202B with the local oscillator signal to shift the target frequency range of output data signal 202B to the original frequency range. Output mixer 216 may receive output data signal 202B from a device under test, another converter, a switch, or anything else capable of signal transmission or relay. Once output data signal 202 has been mixed with the LO signal, output mixer 217 relays output data signal 202 to input band selective filter bank 220.

Amplifier 218 is configured to increase the intensity of the LO signal as it is directed toward input mixer 216. Amplifier 218 receives the LO signal from multiplier 213 by way of switch 214 and switch 219. Once the intensity of the LO signal is increased, amplifier 218 relays the LO signal to input mixer 216.

Although only one amplifier is shown in this exemplary embodiment, those having skill in the art will recognize that one or more amplifiers may be used in between various components in the apparatus in order to ensure that each component receives a well-articulated signal. While this exemplary embodiment includes components for shifting both input and output data signals, in another embodiment, only the components for shifting one data signal are included, which can be useful for one-way communication.

In this embodiment, interference of the LO signal with the input data signal may be avoided because the LO signal and input data signal are amplified prior to mixing with the input mixer, then attenuated, such as with stepped attenuator 140, shown in FIG. 1. This may reduce or drown out spurs, which, when introduced into the input data signal through mixing, have an intensity that is independent of the level of amplification of the LO signal, because the LO signal and the input data signal were adequately amplified at least at the point of mixing. The attenuation after mixing may effectively bring down the intensity of everything, including the spurs.

Figure 3:
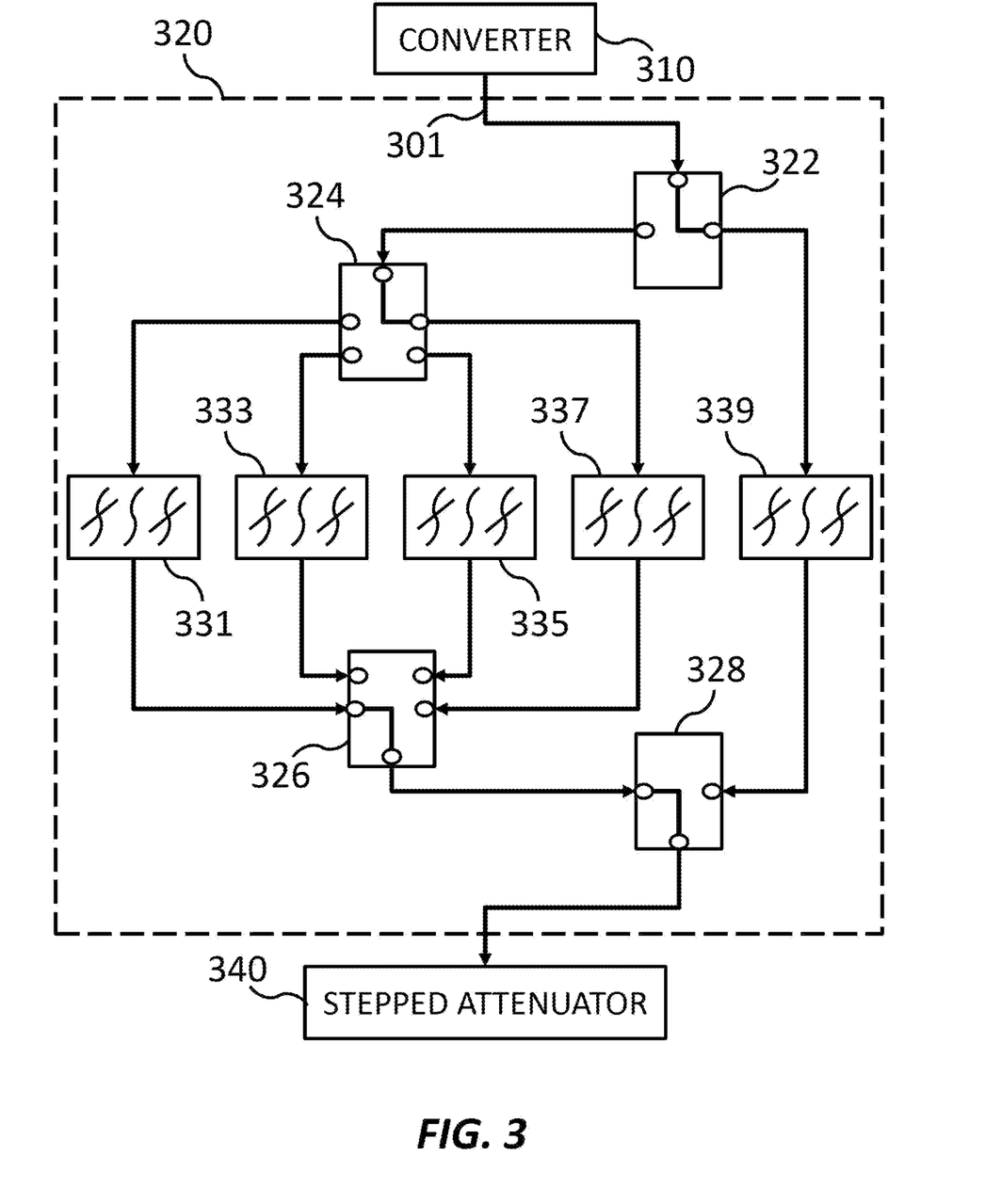
FIG. 3 shows an input band selective filter bank of an apparatus for frequency range conversion, according to an embodiment of the present invention.

FIG. 3 shows an input band selective filter bank 320 of an apparatus for frequency range conversion, according to an embodiment of the present invention. In this exemplary embodiment, input band selective filter bank 320 includes bandpass filters 331, 333, 335, 337, and 339, and two-way switches 322 and 328, and four-way switches 324 and 326.

At any given instant of time, an input data signal 301 is within a more specific frequency range, commonly referred to as a channel. Once the frequency band of input data signal 301 has been shifted to a target frequency band by a converter 310, two-way switches 322 and 328 and four-way switches 324 and 326 work in cooperation to direct input data signal 301 through the proper bandpass filter, according to a subrange of the target frequency band that the channel of input data signal 301 falls within at that instant. For example, if input data signal 301 uses a channel falling within the subrange of bandpass filter 335, then switch 322 directs input data signal 301 from converter 310 to switch 324, and switch 324 directs input data signal 301 from switch 324 to bandpass filter 335. Switch 326 directs input data signal 301 from bandpass filter 335 to switch 328, and switch 328 directs input data signal 301 from switch 326 to stepped attenuator 340.

In this embodiment, interference of the LO signal with the input data signal may be avoided. Avoiding interference of the LO signal with the input data signal may be difficult when there is overlap in the frequency range of the LO signal and the target frequency range. That difficulty increases as the overlap of the frequency range of the LO signal and the target frequency range increases. For example a corresponding subrange of the local oscillation frequency range to avoid may include at least the second harmonic frequency of the LO signal, which is double the frequency (LOX2). However, the amount of bandpass filters and range of each bandpass filter can be established such that each subrange of the plurality of bandpass filters excludes a corresponding subrange of the LO frequency range. In some embodiments, each subrange of the plurality of bandpass filters is distanced from the corresponding subrange of the LO frequency range such that an intensity of the LO signal in the corresponding subrange of the LO frequency range is less than 0.1% of the intensity of the input data signal in the target frequency range.

Input band selective filter bank 320 is more specifically configured to filter an input data signal shifted from an intermediate frequency range of 6.35-17.5 GHz to a 5G frequency range of 24-53 GHz where converter 310 uses an LO signal of 10-20 GHz. Bandpass filters 331, 333, 335, 337, and 339 are configured so that the boundaries of each bandpass filter excludes the frequency range of the LO signal that corresponds to the frequency range of that bandpass filter. More specifically, the 5G frequency range of the input data signal is divided into five subranges, one for each of bandpass filters 331, 333, 335, 337, and 339, in order to distance the range from the LOX2 signal. More specifically, each subrange of the plurality of bandpass filters is distanced from the corresponding subrange of the LO frequency range by at least 2 GHz, and even more specifically by at least 2.2 GHz. In other words, for any given channel, the corresponding bandpass filter passes input data signal 301 while blocking the LO signal and LOX2 signal. The following table shows the specifications of the bandpass filters of input band selective filter bank 320:

TABLE 1

| Bandpass Filter | LO path | 5G (Target)/GHz | LO/ GHz | LOX2/ GHz | LOx2 Minimum Distance to filter/GHz |
|---|---|---|---|---|---|
| 331 | LO | 24.0 | 14.35 | 28.70 | 2.6 |
|  |  | 26.1 | 15.15 | 30.30 |  |
| 333 | LO | 25.1 | 15.15 | 30.30 | 2.5 |
|  |  | 27.8 | 16.00 | 32.00 |  |
| 335 | LOX2 | 26.8 | 10.40 | 20.80 | 2.2 |
|  |  | 33.5 | 12.30 | 24.60 |  |
| 337 | LOX2 | 32.5 | 12.30 | 24.60 | 2.6 |
|  |  | 41.4 | 14.93 | 29.87 |  |
| 339 | LOX2 | 40.4 | 14.93 | 29.87 | 2.6 |
|  |  | 52.8 | 18.90 | 37.80 |  |

Performance may be increased by increasing the portion of the target frequency range that corresponds to the LOx2 path. In converter 310, the LOx1 to LOx2 switching point is 27.3 GHz.

Other embodiments may have different amounts of filters and/or different boundaries of filters yet produce a usable signal. Although in this embodiment, input band selective filter bank 320 is configured to filter a 5G input data signal of 24-53 GHz converted using an LO signal of 10-20 GHz, input band selective filter banks of other embodiments may be configured differently to allow different target frequency ranges while blocking other corresponding LO frequency ranges. Depending on the frequency ranges, it may not be possible to have a minimum distance of 2.2 GHz from the LO signal in some embodiments, whereas in other embodiments 2.2 GHz may not be sufficient. However, many embodiments will be able to perform where each subrange of the plurality of bandpass filters is distanced from the corresponding subrange of the LO frequency range such that an intensity of the LO signal in the corresponding subrange of the LO frequency range is less than 0.1% of the intensity of the input data signal in the target frequency range. Although on each side of the bandpass filters input band selective filter bank 320 uses a combination of a two-way switch and a four-way switch, other switch configurations are possible in other embodiments. For example, in some embodiments the input band selective filter bank includes a single five-way switch, while in other embodiments the input band selective filter bank includes four two-way switches.

Figure 4:
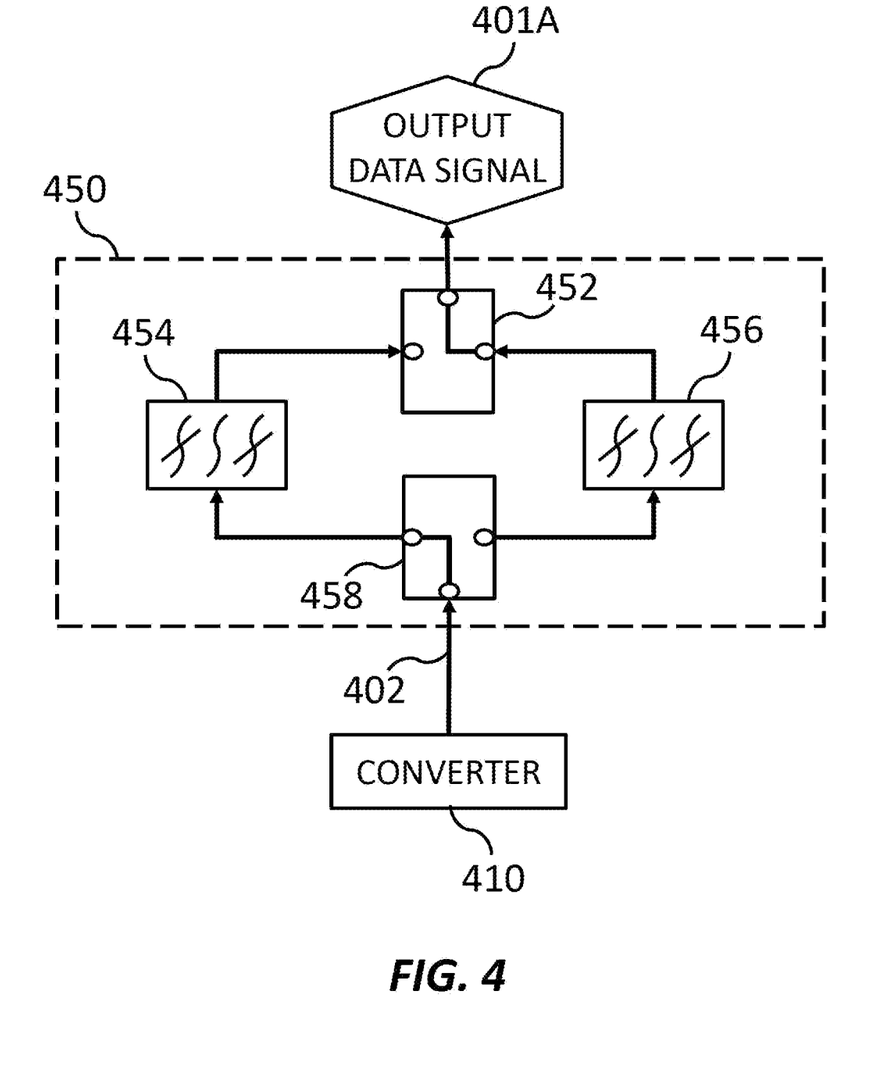
FIG. 4 shows an output band selective filter bank of an apparatus for frequency range conversion, according to an embodiment of the present invention.

FIG. 4 shows an output band selective filter bank 450 of an apparatus for frequency range conversion, according to an embodiment of the present invention. In this exemplary embodiment, output band selective filter bank 450 includes bandpass filters 454 and 456, and two-way switches 452 and 458.

At any given instant of time, an output data signal 402 is also within a channel. Once the frequency band of output data signal 402 has been shifted back to an original frequency band by a converter 410, two-way switches 452 and 458 direct output data signal 402 through the proper bandpass filter, according to a subrange of the original frequency band that the channel of output data signal 402 falls within at that instant. For example, if output data signal 402 uses a channel falling within the subrange of bandpass filter 454, then switch 458 directs output data signal 402 from converter 410 to bandpass filter 454. Switch 452 may direct output data signal 402 from bandpass filter 454 to a testing device, another converter, a switch, or anything else capable of signal reception.

In this embodiment, interference of the LO signal with the output data signal may be avoided. Avoiding interference of the LO signal with the output data signal may be difficult when there is overlap in the LO frequency range and the original frequency range. However, when shifting to a lower frequency range, harmonics of the LO signal are not as much of a problem. For example, where a corresponding subrange of the LO frequency range to avoid is a doubled frequency (LOX2), the corresponding subrange of the undoubled LO frequency range will generally not interfere. Still, the amount of bandpass filters and range of each bandpass filter can be established such that each subrange of the plurality of bandpass filters excludes a corresponding subrange of the LO frequency range. In some embodiments, each subrange of the plurality of bandpass filters is distanced from the corresponding subrange of the LO frequency range such that an intensity of the LO signal in the corresponding subrange of the LO frequency range is less than 0.1% of the intensity of the output data signal in the original frequency range.

Output band selective filter bank 450 is more specifically configured to filter an output data signal shifted from a 5G frequency range of 24-53 GHz to an intermediate frequency range of 6.35-17.5 GHz where converter 410 uses an LO signal of 10-20 GHz. Bandpass filters 454 and 456 are configured so that the boundaries of each bandpass filter excludes the frequency range of the LO signal that corresponds to the frequency range of that bandpass filter. More specifically, the intermediate frequency range of the output data signal is divided into two subranges, one for each of bandpass filters 454 and 456, in order to distance the range from the LOX2 signal, and in some cases from the LO signal. More specifically, each subrange of the plurality of bandpass filters is distanced from the corresponding subrange of the LO frequency range by at least 2 GHz, and even more specifically by at least 2.2 GHz. In other words, for any given channel, the corresponding bandpass filter passes output data signal 402 while blocking the LO signal and LOX2 signal. The following table shows the specifications of the bandpass filters of output band selective filter bank 450:

TABLE 2

| Bandpass Filter | LO path | 5G (Target)/ GHz | IF (Original)/ GHz | LO/ GHz | LOX2/ GHz | LO/LOx2 Minimum Distance to filter/GHz |
|---|---|---|---|---|---|---|
| 454 | LO | 24 | 9.70 | 14.30 | 28.60 | 2.45 (LO) |
|  |  | 27.8 | 11.85 | 15.95 | 31.90 |  |
| 456 | LOX2 | 26.8 | 5.93 | 10.43 | 20.87 | 5.94 (LOX2) |
|  |  | 52.8 | 14.93 | 18.93 | 37.87 | −4.50 (LO) N/A |

Other embodiments may have different amounts of filters and/or different boundaries of filters yet produce a usable signal. In other embodiments, the output band selective filter bank may include a configuration of shared bandpass filters, such as in the exemplary embodiment in the following table.

TABLE 3

| Bandpass Filter | LO path | 5G (Target)/ GHz | IF (Original)/ GHz | LO/ GHz | LOX2/ GHz | LO/LOX2 Minimum Distance to filter/GHz |
|---|---|---|---|---|---|---|
| X | LOx1 | 24 | 9.70 | 14.30 | 28.60 | 2.45 (LO) |
|  |  | 27.8 | 11.85 | 15.95 | 31.90 |  |
| Y | LOx2 | 26.8 | 5.93 | 10.43 | 20.87 | 9.02 (LOX2) |
|  |  | 42.55 | 11.85 | 15.35 | 30.70 | −1.42 (LO) N/A |
| Z | LOx2 | 41.55 | 10.85 | 15.35 | 30.70 | 15.77 (LOX2) |
|  |  | 52.8 | 14.93 | 18.93 | 37.87 | 0.42 (LO) N/A |

The minimum distance to the corresponding subrange of the LO frequency range is the same, 2.45 GHz, with an even greater minimum distance to the corresponding subrange of the LOX2 frequency range, 9.02 GHz. Table 3 indicates "N/A" next to distances from the LO signal that correspond to the LOX2 path, because the LO signal will not significantly interfere in the LOX2 path.

Although in this embodiment, output band selective filter bank 450 is configured to filter an IF output data signal of 6.35-17.5 GHz converted using an LO signal of 10-20 GHz, output band selective filter banks of other embodiments may be configured differently to allow different target frequency ranges while blocking other corresponding LO frequency ranges. Depending on the frequency ranges, it may not be possible to have a minimum distance of 2.2 GHz from the LO signal in some embodiments, whereas in other embodiments 2.2 GHz may not be sufficient. However, many embodiments will be able to perform where each subrange of the plurality of bandpass filters is distanced from the corresponding subrange of the LO frequency range such that an intensity of the LO signal in the corresponding subrange of the LO frequency range is less than 0.1% of the intensity of the output data signal in the original frequency range.

Figure 5:
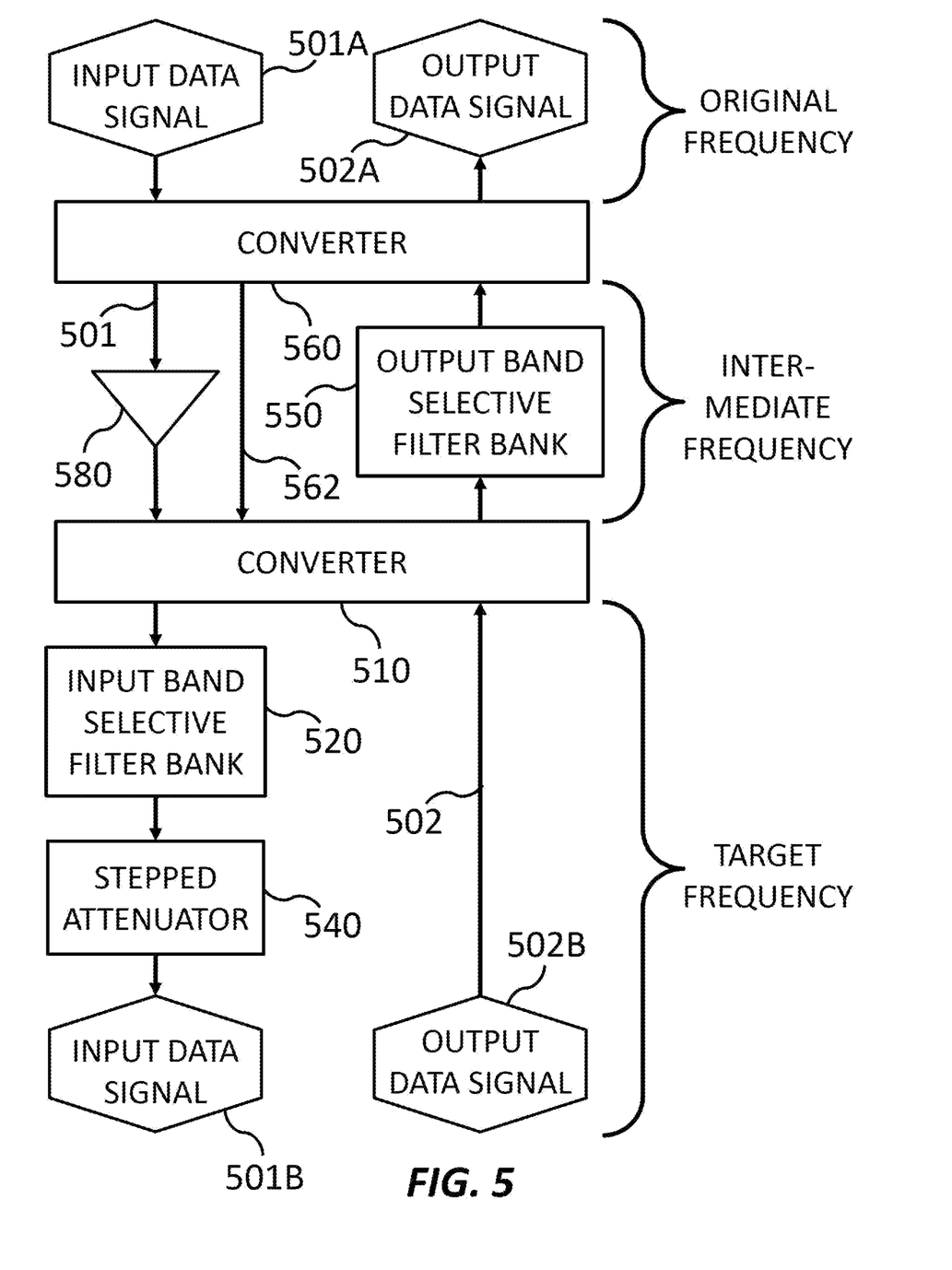
FIG. 5 shows an apparatus for two-stage frequency range conversion, according to an embodiment of the present invention.

FIG. 5 shows an apparatus for two-stage frequency range conversion, according to an embodiment of the present invention. In this exemplary embodiment, the apparatus includes a converter 560, an amplifier 580, a converter 510, an input band selective filter bank 520, a stepped attenuator 540, and an output band selective filter bank 550. Amplifier 580, converter 510, input band selective filter bank 520, stepped attenuator 540, and output band selective filter bank 550 have substantially the same structure and perform substantially the same function as amplifier 180, converter 110, input band selective filter bank 120, stepped attenuator 140, and output band selective filter bank 150 of FIG. 1, respectively, except where the description differs below.

Converter 560 is configured to shift an original frequency range of an input data signal 501A to an intermediate frequency range. Converter 560 may receive input data signal 501A from a testing device, another converter, a switch, or anything else capable of signal transmission or relay. Once the original frequency range of input data signal 501A has been shifted to the intermediate frequency range, converter 560 relays input data signal 501 to amplifier 580. For example, the original frequency range may be 4G (2-8 GHz) and the intermediate frequency range may be a 5G intermediate frequency range.

Converter 560 is further configured to shift the intermediate frequency range of an output data signal 502 to the original frequency range. Converter 560 receives output data signal 502 from output band selective filter bank 550. Once the intermediate frequency range of output data signal 502 has been shifted to the original frequency range, converter 560 may relay output data signal 502 to a testing device, another converter, a switch, or anything else capable of signal reception.

Converter 560 is further configured to produce or relay an LO signal 562 to converter 510. Converter 510, in addition to its structure and functions already described, is configured to receive LO signal 562 from converter 560. Converter 510 is configured to shift an intermediate frequency range of input data signal 501 to a target frequency range. Converter 560 is further configured to shift the target frequency range of output data signal 502 to the intermediate frequency range.

Although converter 560 and converter 510 are shown as separate structures. Converter 560 and converter 510 can be thought of as acting as a single converter configured to shift the original frequency range to an intermediate frequency range and shift the intermediate frequency range to the target frequency range, and also shift the target frequency range to an intermediate frequency range and shift the intermediate frequency range to the original frequency range.

Although only one amplifier is shown in this exemplary embodiment, those having skill in the art will recognize that one or more amplifiers may be used in between various components in the apparatus in order to ensure that each component receives a well-articulated signal. While this exemplary embodiment includes components for shifting both input and output data signals, in another embodiment, only the components for shifting one data signal are included, which can be useful for one-way communication.

Figure 6:
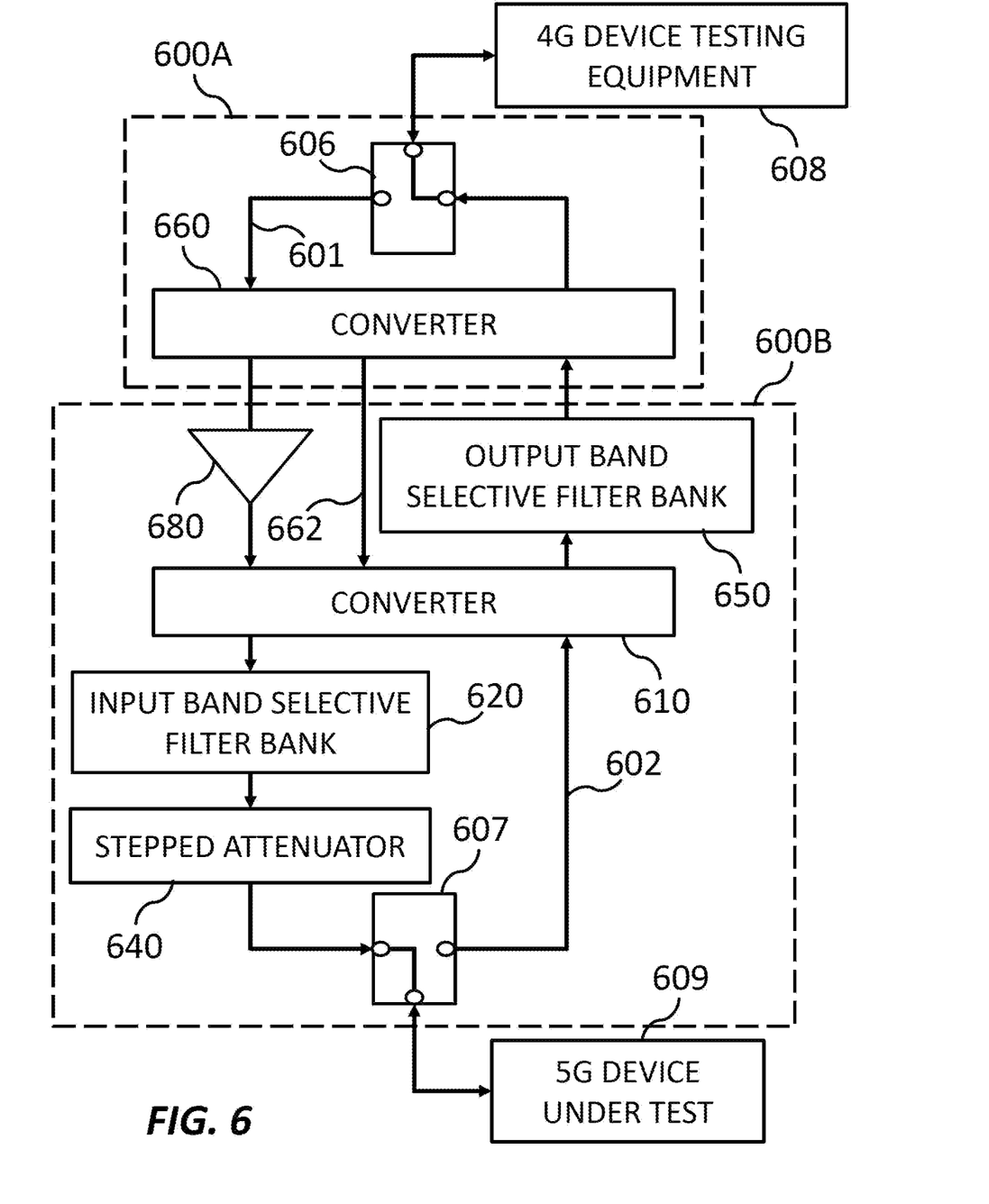
FIG. 6 shows a system for adapting 4G testing equipment to test 5G devices, according to an embodiment of the present invention.

FIG. 6 shows a system for adapting 4G testing equipment to test 5G devices, according to an embodiment of the present invention. In this exemplary embodiment, the system includes apparatus 600A and apparatus 600B.

4G device testing equipment 608 is configured to test the wireless communication capabilities of a 4G device, such as a mobile telephone, a notebook computer, or any other device capable of 4G wireless communication. The system of this embodiment can adapt 4G testing equipment 608 to test the wireless communication capabilities of a 5G device, such as a mobile telephone, a notebook computer, or any other device capable of 5G wireless communication. More specifically, apparatus 600A is configured to shift between the 4G frequency range and an intermediate frequency range, and apparatus 600B is configured to shift between the intermediate frequency range and the 5G frequency range.

Apparatus 600A includes a switch 606 and a converter 660. Switch 606 directs incoming and outgoing signals from 4G device testing equipment 608. Switch 606 is configured to direct an input data signal 601 from 4G device testing equipment 608 to converter 660. Switch 606 is configured to direct an output data signal 602 from converter 660 to 4G device testing equipment 608. Converter 660 has substantially the same structure and performs substantially the same function as converter 560 of FIG. 5, except that converter 660 is necessarily separate from converter 610.

Apparatus 600B includes an amplifier 680, a converter 610, an input band selective filter bank 620, a stepped attenuator 640, a switch 607, and an output band selective filter bank 650. Amplifier 680, converter 610, input band selective filter bank 620, stepped attenuator 640, and output band selective filter bank 650 have substantially the same structure and perform substantially the same function as amplifier 580, converter 510, input band selective filter bank 520, stepped attenuator 540, and output band selective filter bank 550 of FIG. 5, respectively, except where the description differs below. Switch 607 directs incoming and outgoing signals from a 5G device under test 609. Switch 607 is configured to direct an input data signal 601 from stepped attenuator 640 to 5G device under test 609. Switch 607 is configured to direct an output data signal 602 from 5G device under test 609 to converter 610.

Although only one amplifier is shown in this exemplary embodiment, those having skill in the art will recognize that one or more amplifiers may be used in between various components in the apparatus in order to ensure that each component receives a well-articulated signal. While this exemplary embodiment includes components for shifting both input and output data signals, in another embodiment, only the components for shifting one data signal are included, which can be useful for one-way communication.

Figure 7:
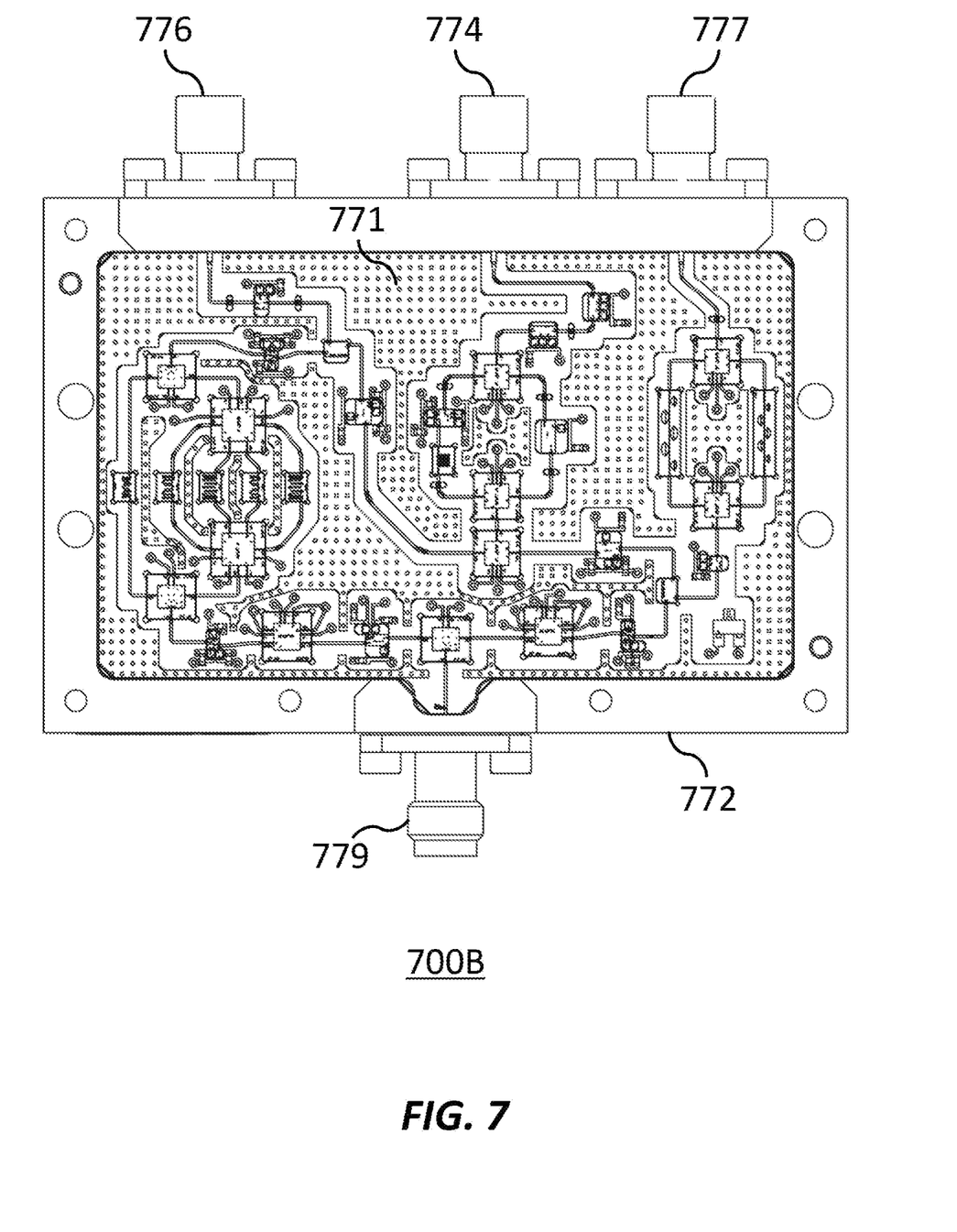
FIG. 7 shows an apparatus for conversion of an intermediate frequency range to a target frequency range, according to an embodiment of the present invention.

FIG. 7 shows an apparatus 700B for conversion of an intermediate frequency range to a target frequency range, according to an embodiment of the present invention. In this exemplary embodiment, apparatus 700B includes substantially the same structures and functions as apparatus 600B in FIG. 6, and additionally includes block 771, housing 772, LO port 774, stim IF port 776, measure IF port 777, and RF port 779.

Block 771 may have various cavities within which the electronic components of apparatus 700B are placed. The cavities may have a depth that exceeds the height of the electronic components. Block 771 may be made of a material that shields the electronic components from interference of other electronic components within apparatus 700B, such as a gold-plated aluminum block. Block 771 may be formed by molding, casting, machining, etc.

Housing 772 envelopes block 771 and the electronic components of apparatus 700B. Housing 772 may be made of any material suitable for shielding the electronic components from interference and that has a thermal conductivity suitable for preventing overheating, the suitability of each of which may change depending on the environment of apparatus 700B.

LO port 774 is adapted to detachably connect to a connector from a converter or any other component capable of sending an LO signal. Stim IF port 776 is adapted to detachably connect to a connector from a converter or any other component capable of sending an input data signal at an intermediate frequency range. Measure IF port 777 is adapted to detachably connect to a connector from a converter or any other component capable of receiving an output data signal at an intermediate frequency range. LO port 774, stim port 776, and measure IF port 77 may each be a female SMA (SubMiniature version A) connector, another type of coaxial connector, or a connector of any other type suitable for transmission of electrical signals.

RF port 779 is adapted to detachably connect to a connector from a 5G device under test or any other component capable of sending and receiving 5G signals. RF port 779 may be a female 1.85 mm connector, or any other type of connector suitable for transmission of electrical signals.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An apparatus comprising:
   a converter configured to shift an original frequency range of an input data signal to a target frequency range;
   an input band selective filter bank configured to route the input data signal through a bandpass filter of a selected subrange within the target frequency range, the input selective filter bank including a plurality of bandpass filters, each bandpass filter having a corresponding subrange within the target frequency range, wherein
   the converter is further configured to shift the original frequency range to an intermediate frequency range and shift the intermediate frequency range to the target frequency range; and
   the original frequency range is 2 to 8 GHz and the target frequency range is 24 to 53 GHz.

2. The apparatus according to claim 1, further comprising:
   a stepped attenuator configured to decrease an intensity of the input data signal at the target frequency range.

3. The apparatus according to claim 1, wherein the converter includes:

an input mixer configured to mix an input data signal with a local oscillation signal of a local oscillation frequency range to shift an original frequency range of an input data signal to a target frequency range;

wherein each subrange of the plurality of bandpass filters excludes a corresponding subrange of the local oscillation frequency range.

4. The apparatus according to claim 3, wherein each subrange of the plurality of bandpass filters is distanced from the corresponding subrange of the local oscillation frequency range by at least 2 GHz.

5. The apparatus according to claim 3, wherein each subrange of the plurality of bandpass filters is distanced from the corresponding subrange of the local oscillation frequency range such that an intensity of the local oscillation signal in the corresponding subrange of the local oscillation frequency range is less than 0.1% of the intensity of the input data signal in the target frequency range.

6. The apparatus according to claim 3, wherein the converter further comprises a frequency doubler configured to double the local oscillation frequency range.

7. The apparatus according to claim 3, wherein the converter is further configured to shift the target frequency range of an output data signal to the original frequency range, the converter further including an output mixer configured to mix an output data signal with the local oscillation signal to shift the target frequency range of the output data signal to the original frequency range.

8. An apparatus comprising:
a converter configured to shift an original frequency range of an input data signal to a target frequency range; and
an input band selective filter bank configured to route the input data signal through a bandpass filter of a selected subrange within the target frequency range, the input selective filter bank including a plurality of bandpass filters, each bandpass filter having a corresponding subrange within the target frequency range,
wherein the converter includes an input mixer configured to mix an input data signal with a local oscillation signal of a local oscillation frequency range to shift an original frequency range of an input data signal to a target frequency range,
wherein each subrange of the plurality of bandpass filters excludes a corresponding subrange of the local oscillation frequency range, and
wherein each subrange of the plurality of bandpass filters is distanced from the corresponding subrange of the local oscillation frequency range by at least 2 GHz.

9. The apparatus according to claim 8, further comprising:
a stepped attenuator configured to decrease an intensity of the input data signal at the target frequency range.

10. The apparatus according to claim 8, wherein each subrange of the plurality of bandpass filters is distanced from the corresponding subrange of the local oscillation frequency range such that an intensity of the local oscillation signal in the corresponding subrange of the local oscillation frequency range is less than 0.1% of the intensity of the input data signal in the target frequency range.

11. The apparatus according to claim 8, wherein the converter further comprises a frequency doubler configured to double the local oscillation frequency range.

12. The apparatus according to claim 8, wherein the converter is further configured to shift the target frequency range of an output data signal to the original frequency range, the converter further including an output mixer configured to mix an output data signal with the local oscillation signal to shift the target frequency range of the output data signal to the original frequency range.

13. The apparatus according to claim 8, wherein the original frequency range is 6.35-17.5 GHz and the target frequency range is 24 to 53 GHz.

14. An apparatus comprising:
a converter configured to shift an original frequency range of an input data signal to a target frequency range; and
an input band selective filter bank configured to route the input data signal through a bandpass filter of a selected subrange within the target frequency range, the input selective filter bank including a plurality of bandpass filters, each bandpass filter having a corresponding subrange within the target frequency range,
wherein the converter includes an input mixer configured to mix an input data signal with a local oscillation signal of a local oscillation frequency range to shift an original frequency range of an input data signal to a target frequency range,
wherein each subrange of the plurality of bandpass filters excludes a corresponding subrange of the local oscillation frequency range, and
wherein each subrange of the plurality of bandpass filters is distanced from the corresponding subrange of the local oscillation frequency range such that an intensity of the local oscillation signal in the corresponding subrange of the local oscillation frequency range is less than 0.1% of the intensity of the input data signal in the target frequency range.

15. The apparatus according to claim 14, further comprising:
a stepped attenuator configured to decrease an intensity of the input data signal at the target frequency range.

16. The apparatus according to claim 14, wherein each subrange of the plurality of bandpass filters is distanced from the corresponding subrange of the local oscillation frequency range by at least 2 GHz.

17. The apparatus according to claim 14, wherein the converter further comprises a frequency doubler configured to double the local oscillation frequency range.

18. The apparatus according to claim 14, wherein the converter is further configured to shift the target frequency range of an output data signal to the original frequency range, the converter further including an output mixer configured to mix an output data signal with the local oscillation signal to shift the target frequency range of the output data signal to the original frequency range.

19. The apparatus according to claim 14, wherein the original frequency range is 6.35-17.5 GHz and the target frequency range is 24 to 53 GHz.

* * * * *